United States Patent [19]

Perthuis et al.

[11] Patent Number: 4,645,786
[45] Date of Patent: Feb. 24, 1987

[54] AROMATIC POLYCARBONATES HAVING REDUCED COMBUSTIBILITY AND METHODS FOR THEIR PREPARATION

[75] Inventors: Joël Perthuis; Pierre Poisson, both of Bernay, France

[73] Assignee: Atochem, France

[21] Appl. No.: 764,291

[22] Filed: Aug. 9, 1985

[30] Foreign Application Priority Data

Aug. 30, 1984 [FR] France .................. 84 13417

[51] Int. Cl.$^4$ .............................................. C08K 5/34
[52] U.S. Cl. ................................. 524/106; 524/540; 260/DIG. 24
[58] Field of Search ............... 524/106, 539, 540; 548/264; 260/DIG. 24

[56] References Cited

U.S. PATENT DOCUMENTS 3,966,530  6/1976  Cutts et al. .................. 548/264
4,433,085  2/1984  Rottmaier et al. ............ 524/83

Primary Examiner—Morton Foelak
Assistant Examiner—Kriellion Morgan
Attorney, Agent, or Firm—Brooks Haidt Haffner & Delahunty

[57] ABSTRACT

Polycarbonate-based compositions the fire-resistance of which is improved with small but effective amounts of a urazole salt having the formula:

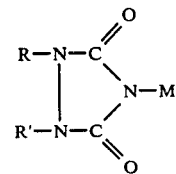

wherein R and R' are the same or different and are hydrogen, an alkyl group having from one to six carbon atoms, phenyl, or halosubstituted phenyl, and M is an alkali metal, many of such fire-resistive polycarbonates being transparent, together with method for preparing such fire-resistive polycarbonates.

12 Claims, No Drawings

AROMATIC POLYCARBONATES HAVING REDUCED COMBUSTIBILITY AND METHODS FOR THEIR PREPARATION

BACKGROUND OF THE INVENTION

The present invention relates to fire-resistive polycarbonate resins, and more particularly, it relates to polycarbonate compositions which contain certain urazolates as fire-resistive agents and to methods for making fire-resistive polycarbonate resins.

The polycarbonate resins are already themselves self-extinguishing materials. Nevertheless, they are considered as still being too flammable for certain types of uses, particularly in the building industry, electric appliances, and in aerospace uses.

However, in order to make the polycarbonates more fire-resistant, a number of solutions have been suggested. Thus, the use of halogenated products, such as decabromodiphenylether, introduced as an additive, or tetrachloro- or tetrabromobisphenol A, condensed as copolymers with the polycarbonate, have already been used. However, the materials so obtained are liable to release hydrogen chloride or hydrogen bromide fumes, which are toxic and highly corrosive, during normal use or during fires.

The use of certain phosphorus derivatives, which do not entail such disadvantages, such as phosphonic esters of phenyl or xylyl acids having halogenated rings, have been suggested. Nevertheless, it is necessary to use quantities such that the mechanical properties of the polycarbonate so loaded and its ability to be worked are seriously affected. At the same time, the cost becomes prohibitive.

Some other additives, such alkaline salts of alkyl or arylsulfonic acids, have also been suggested, but the products obtained are usually translucent or opaque.

THE INVENTION

It has been found according to the present invention that it is possible to obtain transparent polycarbonate resin compositions, and particulary, polycarbonate resin compositions derived from bisphenol A, with improved fire resistance by incorporating therein very small quantities of an alkali metal salt of urazole, also known as 1,2,4-triazolidin-3,5-dione. This invention accordingly contemplates compositions comprising a polycarbonate and an amount of a urazole salt having the formula:

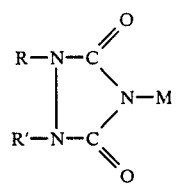

wherein R and R' are the same or different and are hydrogen or an alkyl group having from one to six carbon atoms, a phenyl group, or a halo-substituted phenyl group, substituted with halogens such as chloro or bromo, and M is an alkali metal. The desirable alkali metals are lithium, sodium, or potassium. In certain preferred embodiments, the alkali metal is sodium or potassium.

Particularly preferred fire-resistive additives are the alkaline salts of substituted or unsubstituted urazolates having the formula:

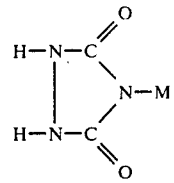

wherein M is sodium or potassium. All of these urazolate salts, whether substituted or unsubstituted, are incorporated into the polycarbonate at a weight concentration of from 0.1 to one part per thousand. In certain preferred embodiments, the amount used is from 0.3 to 0.5 parts per thousand.

These salts are obtained by the addition of the desired sodium or potassium base to an alcoholic solution of the urazole according to the reaction:

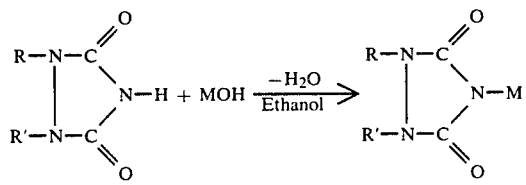

The salt which precipitates is separated from the liquid and then washed.

The urazole itself is readily obtained starting with the hydrazodicarbonamide according to the reaction:

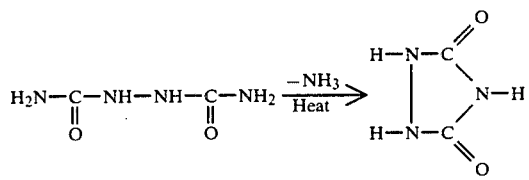

See S. Thiele and O. Strange, Justus Liebigs Ann. Ch. 283, 1 (1895) and Bayer European Patent No. 30627.

The polycarbonates which are rendered fire-resistive according to the present invention by the addition of the substituted or unsubstituted alkaline urazole salts can be various aromatic polycarbonates or aromatic copolycarbonates derived from one or more diphenols such as resorcinol, hydroquinone, dihydroxydiphenyl, bis(hydroxyphenyl)alkanes, bis(hydroxyphenyl)cycloalkanes, bis(hydroxyphenyl)ethers, bis(hydroxyphenyl)sulfides, bis(hydroxyphenyl)ketones, bis(hydroxyphenyl)sulfones, bis(hydroxyphenyl)sulfoxides, α,α'-bis(hydroxyphenyl)di-isopropylbenzenes, and their derivatives having alkylated rings.

More particularly, in certain desirable embodiments of the invention the polycarbonates and copolycarbonates are derived from one or more bisphenols such as bis(4-hydroxyphenyl)-2,2-propane, 4,4'-dihydroxydiphenyl, 2,4-bis(4-hydroxyphenyl)-2-methylbutane, 1,1-bis(4-hydroxyphenyl)cyclohexane, α,α'-bis(4-hydroxyphenyl)-p-diisopropylbenzene, 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)cyclohexane, and α,α'-bis(3,5-dimethyl-4-hydroxyphenyl)-p-diisopropylbenzene.

The preferred polycarbonates and copolycarbonates are those derived from one or more bisphenols which are 2,2-bis(4-hydroxyphenyl)propane, also called bisphenol A; 2,2-bis(3,5-dimethyl-4-hydroxyphenyl)propane; and 1,1-bis(4-hydroxyphenyl)cyclohexane.

These aromatic polycarbonates, which can be prepared by the well-known processes of transesterification in a molten medium between one or more selected diphenols and diphenyl carbonate or of interfacial reaction between one or more selected diphenols and phosgene, are generally thermoplastic and have viscometric molecular weights from 15,000 to 60,000, calculated from their solution viscosity. In certain preferred embodiments, the molecular weights are from 20,000 to 40,000.

In addition to the fire-retarding additive, the polycarbonate compositions of this invention can also contain other additives such as pigments, dyes, ultraviolet stabilizers, mold release agents, heat stabilizers, and extenders. These compositions can also contain fiberglass, particularly from ten to 35 percent by weight of the polycarbonate, for the purpose of improving the rigidity of the polycarbonate thermoplastic resin.

Further, agents such as polysiloxanes or polytetrafluoroethylenes, can be added to diminish the dripping. It is especially preferred to use polytetrafluoroethylenes in the form of a white powder obtained by aqueous emulsion polymerization of tetrafluoroethylene and having a molecular weight of from 100,000 to 1,000,000. In tests carried out in connection with the present invention, Hostaflon TF 9205 powder made by the Hoechst organization has been used. The amount of polytetrafluoroethylene used herein is desirably from 0.1 to one percent by weight of the polycarbonate.

The incorporation of the fire-retarding salt of this invention is accomplished by mixing it into the polycarbonate in the molten state. Any mixing apparatus which assures good dispersion can be used, including single or double screw extruders, Buss mixers, and the like.

The preferred method comprises dry mixing, for instance in a tumbler, of polycarbonate pellets and the urazole salt and feeding the mixture so obtained to an extruder hopper. The noodles which issue molten from the multiple aperture drawplate are cooled by passage through a water bath and are cut into pellets.

All parts, percentages, proportions, and ratios herein are by weight unless otherwise stated.

The following Examples are given to illustrate embodiments of the invention as it is presently preferred to practice it. It will be understood that these Examples are illustrative, and the invention is not to be considered as restricted thereto except as indicated in the appended claims.

The specimens intended for standardized combustion tests are obtained by injection molding the pellets obtained after suitable drying, the injection temperatures being on the order of 280 degrees to 320 degrees C.

Among the various existing tests used to evaluate the behavior of the polycarbonates in fire, two combustion tests are considered particularly significant. These have been utilized to evaluate the behavior of the polycarbonates of this invention. One of these is the test to determine the Oxygen Index Limit (O.I.L.) according to ASTM standard D 28-63 and the other one is the UL 94 combustion test described in Bulletin 94 of the Underwriters' Laboratories.

In the case of compositions not having fillers which would cause opacification, the transparency can be evaluated by means of a Type XL 211 Gardner Hazemeter, according to ASTM Standard D1003-61.

The Examples which are summarized in Table I are carried out on commercial polycarbonate, obtained by the interfacial reaction of phosgene and bisphenol A and having a molecular weight of 25,000. Different quantities of the urazolates are incorporated into these polycarbonates by the methods described above. The pellets obtained are used to mold parallelopidic rectangular specimens 3.2 mm thick to carry out the standardized flammability tests.

TABLE I

| Example | Parts per thousand | | | Oxygen Index Percent | Mean Combustion Time, sec. | Drops igniting the cotton | UL 94 Class 3.2 mm | Transparency of specimen |
| --- | --- | --- | --- | --- | --- | --- | --- | --- |
| | Polycarbonate | Urazolate | Hostaflon TF 9205 | | | | | |
| Comparison | 1,000 | 0 | 0 | 25 | 14 | Numerous | $V_2$ | yes |
| I | 1,000 | 0.3 Sodium urazolate | 0 | 32 | 7.7 | 1 to 2 drops per specimen | $V_2$ | yes |
| II | 1,000 | 0.3 Potassium urazolate | 0 | 31.7 | 4.2 | 1 to 2 drops per specimen | $V_2$ | yes |
| III | 1,000 | 0.5 Sodium urazolate | 0 | 29.8 | 4.6 | 1 drop per specimen | $V_2$ | yes |
| IV | 1,000 | 0.5 Potassium urazolate | 0 | 32.1 | 3.2 | 1 drop per specimen | $V_2$ | yes |
| V | 1,000 | 0.5 Potassium urazolate | 5 | 29 | 1.9 | 0 | $V_0$ | no |

What is claimed is:

1. Fire-resistive polycarbonate resin compositions comprising a polycarbonate resin and a small amount of a urazole salt effective to provide fire-resistance, the urazole salt having the formula:

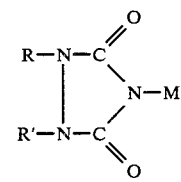

wherein R and R' are the same or different and are hydrogen, an alkyl group having from one to six carbon atoms, phenyl, or halo-substituted phenyl and M is an alkali metal.

2. A composition according to claim 1 wherein the alkali metal is lithium, sodium, or potassium.

3. A composition according to claim 1 wherein the halo substituents on the phenyl are chloro or bromo.

4. A composition according to claim 1 wherein the quantity of the urazole salt is from 0.1 to one part by weight per thousand of the polycarbonate resin.

5. A composition according to claim 1 wherein the quantity of the urazole salt is from 0.3 to 0.5 parts by weight per thousand of the olycarbonate resin.

6. A composition according to claim 1 wherein R and R' are hydrogen and the alkali metal is sodium or potassium.

7. A composition according to claim 1 wherein the polycarbonate or copolycarbonate is derived from at least one bisphenol which is a 4-hydroxyphenol.

8. A composition according to claim 7 wherein the bisphenol is 2,2-bis(4-hydroxyphenyl)propane, 2,2-bis(3,5-dimethyl-4-hydroxyphenyl)propane, or 1,1-bis(4-hydroxyphenyl)cyclohexane.

9. A transparent composition according to claim 1.

10. A composition according to claim 1 containin a polysiloxane or polytetrafluoroethylene anti-drip agent.

11. A composition according to claim 9 wherein the anti-drip agent is present in an amount of from 0.1 to one percent by weight, of the polycarbonate.

12. A method for flameproofing polycarbonates which comprises adding to a polycarbonate-based polymer a small amount of a urazole salt having the formula:

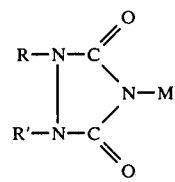

wherein R and R' are the same or different and are hydrogen, an alkyl group having from one to six carbon atoms, phenyl, or halo-substituted phenyl and M is an alkali metal, effective to provide fire resistive qualities to the polycarbonate-based polymer.

* * * * *

UNITED STATES PATENT AND TRADEMARK OFFICE
CERTIFICATE OF CORRECTION

PATENT NO.  : 4,645,786
DATED       : February 24, 1987
INVENTOR(S) : Joel Perthuis et al It is certified that error appears in the above-identified patent and that said Letters Patent is hereby corrected as shown below:

Column 5, line 11 "olycarbonate" should read

-- polycarbonate --

Column 6, line 1, "containin" should read -- containing --.

Signed and Sealed this

Twenty-seventh Day of October, 1987

Attest:

DONALD J. QUIGG

*Attesting Officer*   *Commissioner of Patents and Trademarks*